(12) United States Patent
Liu et al.

(10) Patent No.: US 9,063,238 B2
(45) Date of Patent: Jun. 23, 2015

(54) COMPLEMENTARY METAL-OXIDE-SEMICONDUCTOR X-RAY DETECTOR

(75) Inventors: James Zhengshe Liu, Salt Lake City, UT (US); David Ellis Barker, Salt Lake City, UT (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 76 days.

(21) Appl. No.: 13/569,890

(22) Filed: Aug. 8, 2012

(65) Prior Publication Data
US 2014/0042328 A1 Feb. 13, 2014

(51) Int. Cl.
G01T 1/20 (2006.01)
H01L 27/146 (2006.01)
G01T 1/24 (2006.01)

(52) U.S. Cl.
CPC .............. G01T 1/2018 (2013.01); G01T 1/244 (2013.01); G01T 1/2002 (2013.01)

(58) Field of Classification Search
CPC ...... G01T 1/2018; G01T 1/2002; G01T 1/244
USPC ................................. 250/366, 370.11, 361 R
See application file for complete search history.

(56) References Cited

U.S. PATENT DOCUMENTS

| | | | | |
|---|---|---|---|---|
| 3,978,410 | A * | 8/1976 | Fletcher et al. | 455/96 |
| 5,464,984 | A * | 11/1995 | Cox et al. | 250/370.11 |
| 5,804,832 | A * | 9/1998 | Crowell et al. | 250/580 |
| 6,404,854 | B1 * | 6/2002 | Carroll et al. | 378/98.8 |
| 6,744,052 | B1 * | 6/2004 | Petersson et al. | 250/370.11 |
| 7,193,218 | B2 * | 3/2007 | Nagano | 250/370.11 |
| 7,745,797 | B1 * | 6/2010 | Liu et al. | 250/370.09 |
| 2003/0001100 | A1 * | 1/2003 | Dejule | 250/370.11 |
| 2004/0079890 | A1 * | 4/2004 | Fraser et al. | 250/370.11 |
| 2004/0124362 | A1 * | 7/2004 | Hennessy et al. | 250/370.11 |
| 2006/0091312 | A1 * | 5/2006 | Saenger | 250/361 R |
| 2007/0051893 | A1 * | 3/2007 | Matsumoto | 250/370.01 |
| 2008/0067392 | A1 * | 3/2008 | Miyaguchi | 250/370.11 |
| 2008/0217545 | A1 | 9/2008 | Liu et al. | |
| 2008/0277588 | A1 | 11/2008 | Zeitler et al. | |
| 2010/0008473 | A1 * | 1/2010 | Liu et al. | 378/189 |
| 2010/0258730 | A1 * | 10/2010 | Sumi | 250/361 R |
| 2011/0017912 | A1 * | 1/2011 | Goto et al. | 250/361 R |
| 2012/0043468 | A1 * | 2/2012 | Flitsch et al. | 250/366 |
| 2013/0037723 | A1 * | 2/2013 | Verschuren et al. | 250/363.01 |
| 2014/0001367 | A1 * | 1/2014 | Anzai et al. | 250/366 |

FOREIGN PATENT DOCUMENTS

WO   WO 2009084635 A1 * 7/2009

OTHER PUBLICATIONS

International Search Report and Written Opinion for PCT/US2013/054074, mail date Jan. 29, 2014, 9 pages.

* cited by examiner

Primary Examiner — David Porta
Assistant Examiner — Jeremy S Valentiner
(74) Attorney, Agent, or Firm — Fletcher Yoder, P.C.

(57) ABSTRACT

In accordance with one embodiment, a digital X-ray detector is provided. The detector includes a scintillator layer configured to absorb radiation emitted from a radiation source and to emit optical photons in response to the absorbed radiation. The detector also includes a complementary metal-oxide-semiconductor (CMOS) light imager that is configured to absorb the optical photons emitted by the scintillator layer. The CMOS light imager includes a first surface and a second surface, and the first surface is disposed opposite the second surface. The scintillator layer contacts the first surface of the CMOS light imager.

12 Claims, 2 Drawing Sheets

COMPLEMENTARY METAL-OXIDE-SEMICONDUCTOR X-RAY DETECTOR

BACKGROUND

The subject matter disclosed herein relates generally to X-ray imaging systems, and more particularly to an X-ray detector for such systems.

The use of digital radiological imaging continues to become increasingly invaluable with respect to a variety of technical applications. Digital radiological imaging is a mainstay in the medical field allowing health care professionals to quickly discern and diagnose internal abnormalities of their patients. Additionally, its use has become increasingly important in industrial fields for visualizing internal contents of parts, baggage, parcels, and other objects, and for visualizing the structural integrity of objects and other purposes. Indeed, the evolution of digital X-ray detectors has enhanced both workflow and image quality in the field of radiological imaging.

Generally, radiological imaging involves the generation of X-rays that are directed toward an object of interest. The X-rays pass through and around the object and then impact an X-ray film, X-ray cassette, or digital X-ray detector. In the context of the digital X-ray detector, these X-ray photons traverse a scintillator that converts the X-ray photons to visible light, or optical photons. The optical photons then collide with the photodetectors of a digital X-ray receptor and are converted to electrical signals which are then processed as digital images that can be readily viewed, stored, and/or transmitted electronically. As digital X-ray detectors continue to replace conventional X-ray film and X-ray cassettes, the need for improving efficiency and quality of digital radiological imaging remains at the forefront.

One of the problems associated with digital imagery is due to a suboptimal assembly of the detectors themselves. For example, certain digital detectors such as complementary metal-oxide-semiconductor (CMOS) based detectors use detachable scintillator plates that need to be coated with a protective material. However, these protective materials exhibit both poor light transparency properties as well as poor light reflective properties. These properties may interfere with the function of the scintillator plate causing loss of useful light photons. In order to utilize digital X-ray imagery to its full potential, there is a need to improve the design of the digital X-ray detectors in order to increase X-ray detector efficiency.

BRIEF DESCRIPTION

In accordance with one embodiment, a digital X-ray detector is provided. The detector includes a scintillator layer configured to absorb radiation emitted from a radiation source and to emit optical photons in response to the absorbed radiation. The detector also includes a complementary metal-oxide-semiconductor (CMOS) light imager that is configured to absorb the optical photons emitted by the scintillator layer. The CMOS light imager includes a first surface and a second surface, and the first surface is disposed opposite the second surface. The scintillator layer contacts the first surface of the CMOS light imager.

In accordance with another embodiment, a digital X-ray detector is provided. The detector includes a scintillator layer configured to absorb radiation emitted from a radiation source and to emit optical photons in response to the absorbed radiation. The detector also includes a complementary metal-oxide-semiconductor (CMOS) light imager having a photodetector layer configured to absorb the optical photons emitted by the scintillator layer. The scintillator layer contacts the photodetection layer. The detector further includes a reflective layer that is disposed on a surface of the scintillator layer opposite from the light imager. The reflective layer is configured to reflect optical photons emitted by the scintillator towards the CMOS light imager.

In accordance with a further embodiment, a method is provided for assembling a digital X-ray detector. The method includes depositing a scintillator layer onto a photodetector layer of a CMOS light imager. The scintillator layer contacts the CMOS light imager. The method also includes disposing a reflective layer on a surface of the scintillator layer opposite from the CMOS light imager. The reflective layer is configured to reflect optical photons emitted by the scintillator towards the CMOS light imager.

BRIEF DESCRIPTION OF THE DRAWINGS

These and other features, aspects, and advantages of the disclosed subject matter will become better understood when the following detailed description is read with reference to the accompanying drawings in which like characters represent like parts throughout the drawings, wherein.

DETAILED DESCRIPTION

Figure 1:
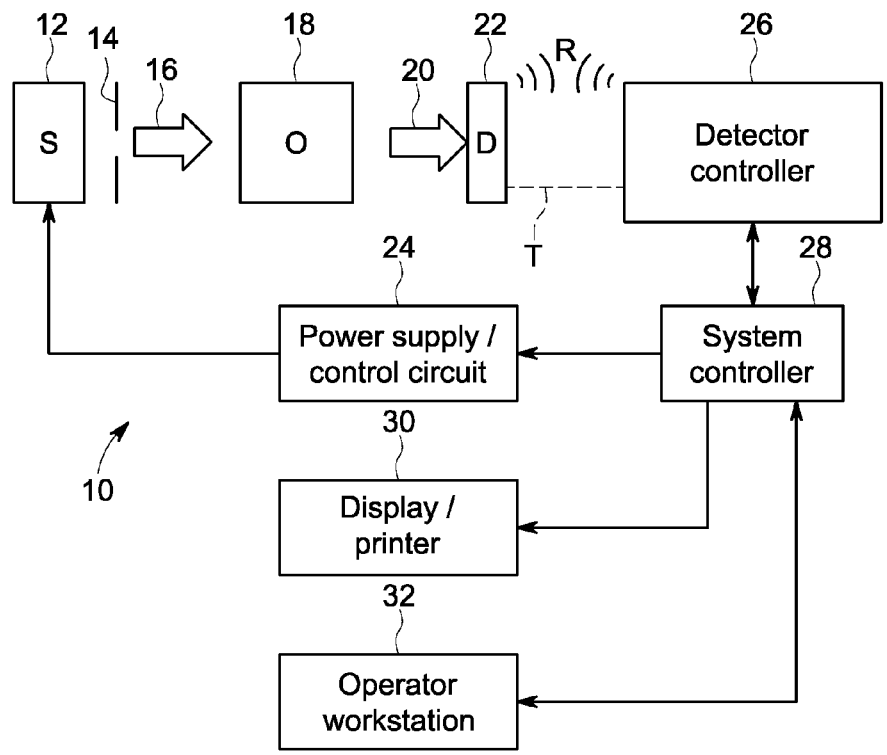
FIG. 1 is a diagrammatical overview of a digital X-ray imaging system in which the present technique may be utilized.

Turning now to the drawings, FIG. 1 illustrates diagrammatically an imaging system 10 for acquiring and processing discrete pixel image data. In the illustrated embodiment, the imaging system 10 is a digital X-ray system designed both to acquire original image data and to process the image data for display in accordance with the present technique. In the embodiment illustrated in FIG. 1, imaging system 10 includes an X-ray radiation source 12 positioned adjacent to a collimator 14. The collimator 14 permits a stream of radiation 16 to pass into a region in which an object or subject 18 is positioned. A portion of the radiation 20 passes through or around the object and impacts a digital X-ray detector, represented generally at reference numeral 22. In certain embodiments, the detector 22 may include a complementary metal-oxide-semiconductor (CMOS) based detector. As will be appreciated by those skilled in the art, the digital X-ray detector 22 may convert the X-ray photons received on its surface to lower energy photons, and subsequently to electric signals, which are acquired and processed to reconstruct an image of the features within the subject.

The X-ray radiation source 12 is controlled by a power supply/control circuit 24 which supplies both power and control signals for examination sequences. Moreover, the digital X-ray detector 22 is communicatively coupled to a detector controller 26 which commands acquisition of the signals generated in the detector 22. In the presently illustrated embodiment, the detector 22 may communicate with the detector controller 26 via any suitable wireless communication standard (R), although the use of digital X-ray detectors 22 that communicate with the detector controller 26 through a cable (T) or some other mechanical connection are also envisaged. The detector controller 26 may also execute various signal processing and filtration functions, such as for initial adjustment of dynamic ranges, interleaving of digital image data, and so forth.

Both the power supply/control circuit 24 and the detector controller 26 are responsive to signals from a system controller 28. In general, the system controller 28 commands operation of the imaging system to execute examination protocols and to process acquired image data. In the present context, the system controller 28 also includes signal processing circuitry, typically based upon a programmed general purpose or application-specific digital computer; and associated manufactures, such as optical memory devices, magnetic memory devices, or solid-state memory devices, for storing programs and routines executed by a processor of the computer to carry out various functionalities, as well as for storing configuration parameters and image data; interface circuits; and so forth.

In the embodiment illustrated in FIG. 1, the system controller 28 is linked to at least one output device, such as a display or printer as indicated at reference numeral 30. The output device may include standard or special purpose computer monitors and associated processing circuitry. One or more operator workstations 32 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

The X-ray system 10 as shown in FIG. 1 may also include a variety of alternative embodiments generally configured to meet the particular needs of certain applications. For example, the X-ray system 10 may be either fixed, a mobile system, or a mobile c-arm system where the X-ray detector is either permanently mounted inside one end of the c-arm or removable from the system. Further, the X-ray system 10 may be a table and/or wall stand system in a fixed X-ray room where the X-ray detector 22 is either permanently mounted together with the system or portable. Alternatively, the X-ray system 10 may be a mobile X-ray system with a portable X-ray detector. Such a portable X-ray may be further constructed with a detachable tether or cable used to connect the detector readout electronics to the data acquisition system of the scanner. When not in use, a portable X-ray detector may be detached from the scan station for storage or transfer.

Figure 2:
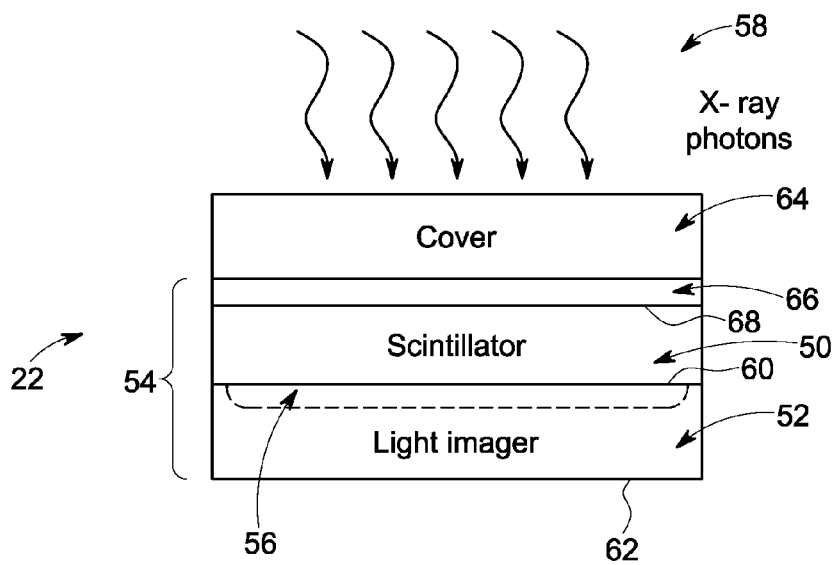
FIG. 2 is a side schematic view of a digital X-ray detector, in accordance with an embodiment of the present technique.
Figure 3:
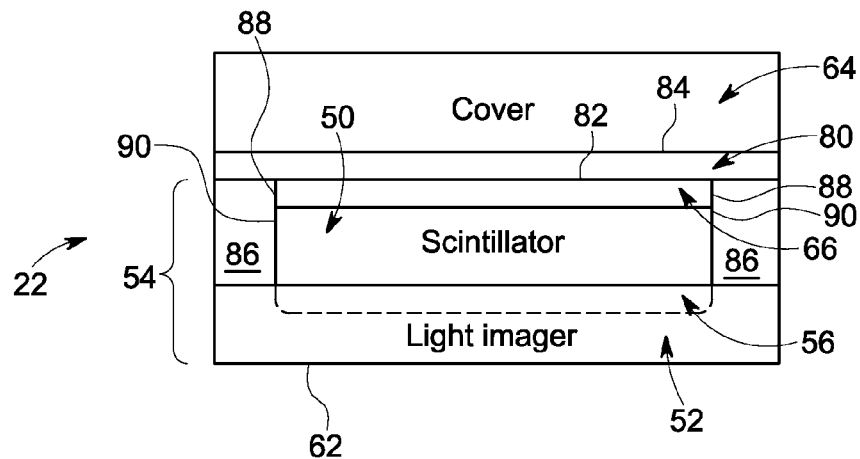
FIG. 3 is a side schematic view of a digital X-ray detector having a moisture blocking layer, in accordance with an embodiment of the present technique.
Figure 4:
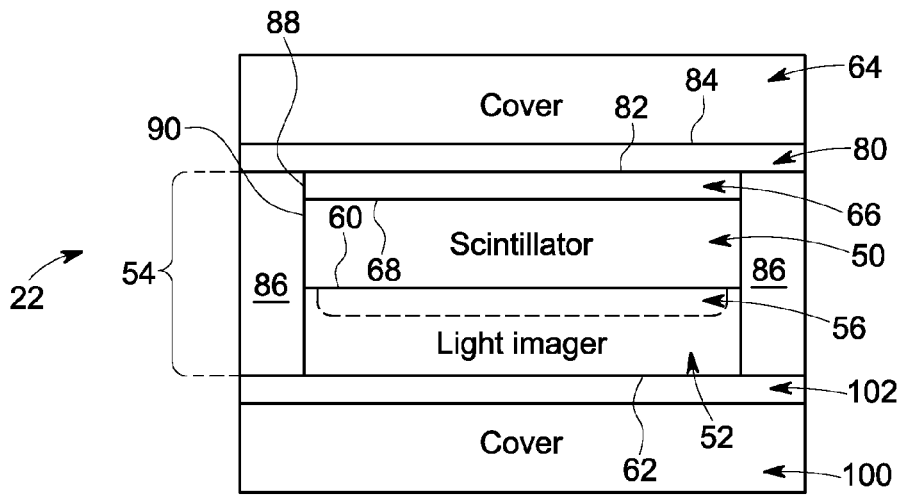
FIG. 4 is a side schematic view of a digital X-ray detector having multiple moisture blocking layers, in accordance with an embodiment of the present technique.

FIGS. 2-4 illustrate different embodiments of the detector 22 (e.g., a CMOS based detector) that include a scintillator layer 50 disposed directly on a light imager 52 (e.g., CMOS light imager). Directly depositing the scintillator layer 50 on the light imager 52 may improve the detective quantum efficiency (DQE) of the detector. The components of the detector 22 illustrated may represent only some of the components present in such detection systems. For example, these detectors 22 may include electronics, an outer cover or sleeve, etc. A schematic view of a digital X-ray detector 22 is provided in FIG. 2. As discussed herein, the digital X-ray detector 22 includes a detector array 54 that includes a scintillator layer 50 and a light imager 52 (e.g., a CMOS light imager). In addition, the CMOS light imager 52 includes a photodetection layer 56. The scintillator layer 50 may be fabricated from suitable scintillator compositions such as Cesium Iodide (CsI).

As discussed above, traditional detached scintillator plates, e.g., in CMOS based detectors, are coated by a protective film that exhibits poor light reflection and transparency properties which, in turn, results in sub-optimal performance of the photodetection capabilities of the X-ray detector. To alleviate this deficiency, the scintillator layer 50 of the detector array 54 is directly disposed upon the photodetection layer 56 of the CMOS light imager 52. Thus, the scintillator layer 50 directly contacts the photodetection layer 56. In particular, the digital imager 52 includes a first surface 60 (e.g., the top surface where the photodetector layer 56 is disposed) and a second surface 62 (e.g., the bottom surface of the CMOS light imager) opposite from the first surface 60. The scintillator layer 50 is directly disposed on the top surface 60.

The scintillator layer 50 and the photodetection layer 56 of the CMOS light imager 52 function in combination to convert X-ray photons 58 to electrical signals for acquiring and processing image data. Generally, X-ray photons 58 are emitted from a radiation source 12, traverse the area in which an object or subject 18 is positioned, and collide with the scintillator layer 50. The scintillator layer 50 converts the X-ray photons 58 to lower energy optical photons and is designed to emit light proportional to the energy and the amount of X-rays absorbed. As such, light emissions will be higher in those regions of the scintillator layer 50 where more X-rays were received. Since the composition of the object or subject 18 will attenuate the X-rays projected by the radiation source 12 to varying degrees, the energy level and the amount of the X-ray photons 58 colliding with the scintillator layer 50 will not be uniform across the scintillator layer 50. The non-uniform collision results in the variation of light emission that will be used to generate contrast in the reconstructed image.

After the X-ray photons 58 are converted to optical photons, the resulting optical photons emitted by the scintillator layer 50 are detected by the photodetection layer 56 of the CMOS light imager 52. The photodetection layer 50 may include an array of photosensitive elements or detector elements to store an electrical charge in proportion to the quantity of incident light absorbed by the respective detector elements. Generally, each detector element has a light sensitive region and an electronically-controlled region for the storage and output of electrical charge from that detector element. The light sensitive region may be composed of a photodiode, which absorbs light and subsequently creates and stores electronic charge. After exposure, the electrical charge in each detector element is read out via logic-controlled electronics and processed by the imaging system 10 as described above.

In some alternative embodiments, the light imager 52 may be a charged coupled device (CCD) imager, amorphous silicon receptor light imager, or suitable field-effect transistor controlled light imager. The scintillator layer 50 may be deposited directly onto and in direct contact with any light imager to prevent the reduction in useful light photons as discussed above.

To protect the detector array 54 from light contamination and to provide structural support, an array cover 64 (e.g., a first detector array cover) may be placed over the surface of the scintillator layer 50 as shown in FIG. 2. The first detector array cover 64 may be fabricated with metal, metal alloy, plastic, a composite material, or a combination of the above material. In one embodiment, the first detector array cover 64 may be composed of a lightweight, durable composite material such as a carbon fiber. In certain embodiments, optical photons emitted from the scintillator layer 50 may travel towards the first detector array cover 64 instead of the photodetection layer 56. To redirect the optical photons, the detector array 54 may include a light reflector 66, composed of silver or other suitable light reflective material, disposed on a surface 68 (e.g., a top surface) of the scintillation layer 50 opposite the light imager 52 just under the first detector array cover 64. The light reflector 66 is designed to reflect optical photons from the scintillator 50 back towards the photodetection layer 56 resulting in less quantum noise, stronger light signal, and more efficient overall performance of the X-ray detector 22.

In certain embodiments, the detector 22 may include a moisture blocking layer or material to block moisture from entering into the detector array 54 and contaminating the scintillator material or other components. As illustrated in FIG. 3, the detector 22 includes a moisture blocking layer 80 (e.g., aluminum film) disposed on a surface 82 (e.g., top surface) of the reflector 66 opposite from the scintillator layer 50. For example, the moisture blocking layer 80 may be disposed on surface 84 (e.g., bottom surface) of the first detector array cover 64. In addition, the detector 22 includes a suitable waterproof sealing material 86 disposed about the outer edges 88, 90 of the scintillator layer 50 and reflector 66, respectively, to seal these components between the moisture blocking layer 80 and light imager 52.

In certain embodiments, the detector 22 includes further structural support beneath the imager 52. For example, as depicted in FIG. 4, the detector 22 includes an array cover 100 (e.g., second detector array cover). The second detector array cover 100 may be fabricated from metal, metal alloy, plastic, a composite material, carbon fiber, or a combination of these materials similar to the first detector array cover 64. In order to block moisture contamination, the detector 22 may include the moisture blocking layer 80 and the sealing material 86 as described in FIG. 3. In addition, the detector 22 includes an additional moisture blocking layer 102 (e.g., aluminum film) disposed on the bottom surface 62 of the light imager 52 opposite the scintillator layer 50. In particular, the moisture blocking layer 102 is disposed between the light imager 52 and the second detector array cover 100.

Figure 5:
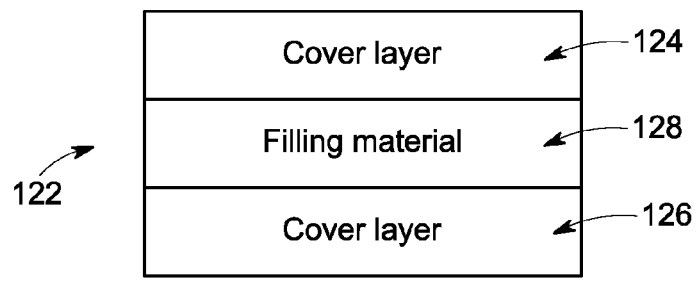
FIG. 5 is a side schematic view of a detector array cover assembly, in accordance with an embodiment of the present technique.

In certain embodiments, the detector 22 may include lightweight covers 64, 100. For example, the covers 64, 100 may include a sandwich configuration 122 as depicted in FIG. 5. This sandwich configuration 122 enables the use of detector array covers with reduced weight compared to the detector covers 64, 100 illustrated in FIGS. 2-4. The sandwich configuration 122 may include a first array cover layer 124 and a second array cover layer 126 with an intervening filling material 128. The materials for the array cover layers 124, 126 may be those described above for the covers 64, 100 depicted in FIGS. 2-4. The intervening filling material 128 enables the utilization of multiple detector array covers with reduced weight. In this embodiment, the filling material 128, which may be Rohacell form, a foam core, graphite-fiber epoxy resin, or other material enables the utilization of light-weight detector covers without a sacrifice in rigidity of support which may aid in the manufacturability of the detector assembly line. In certain embodiments, multiple sandwich layers may be utilized with each cover layer 64, 100.

In accordance with a method of assembly, detector 22 as shown in FIG. 3, may be assembled by directly depositing the scintillator layer 50 onto the photodetection layer 56 of a CMOS light imager 52. The method may also include depositing a light reflector 66 onto the top surface 68 of the scintillator layer 50. A first detector array cover 64, such as a carbon fiber cover, may be deposited onto the light reflector 66 resulting in an assembly configuration as depicted in FIG. 3. In order to ensure adequate moisture sealing properties, a method may include assembling the detector array with a detector cover 64 having a moisture blocking layer 80 (e.g., aluminum film) covering the bottom surface 84 of the top detector cover 64.

Alternatively, a method may include assembling the X-ray detector 22 in a tiling configuration as shown in FIG. 4. A CMOS light imager 52 may be disposed upon the second detector cover 100 fabricated from carbon fiber or other suitable material. The scintillator layer 50 may then be directly deposited onto the photodetection layer 56 of the CMOS light imager 52. A method for certain embodiments will include the depositing of the light reflector 66, which may be composed of silver, on top of the scintillator layer 50 for the purpose of redirecting optical photons emitted from the scintillator layer 50 back towards the CMOS light imager 52. The first detector array cover 64, which may or may not be coated with a moisture blocking layer 80 on its bottom surface 84, is then deposited directly onto the silver light reflector 66. Sealing material 86 may then be used as described to seal the detector array 54 between the covers 64, 100.

Yet another method may be used to construct the detector array cover 64, 100 in a sandwich configuration 122 for the purpose of reducing the weight of the covers 64, 100 without sacrificing rigidity and durability. This method may include the depositing of suitable filling material 126 between first and second thin detector array cover layers 124 and 128. In one embodiment, this filling material may be a Rohacell foam core. Alternatively, the sandwich configuration 122 shown in FIG. 5 may be three detector array cover layers with two intermediate foam cores, or more layers.

The technical advantage of the disclosed X-ray detector assembly is that it optimizes X-ray detector performance as measured by DQE. For example, the detector 22 includes the scintillator layer 50 disposed directly on the light imager 52 (e.g., CMOS light imager). Directly depositing the scintillator layer 50 onto the light imager 52 as disclosed herein obviates the need for detached scintillator plates and will avoid the photon loss that results from any protective film that typically would be disposed there between.

This written description uses examples to disclose the present subject matter, including the best mode, and also to enable any person skilled in the art to practice the present approaches, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A digital X-ray detector comprising:
  a scintillator layer configured to absorb radiation emitted from a radiation source and to emit optical photons in response to the absorbed radiation;
  a complementary metal-oxide-semiconductor (CMOS) light imager configured to absorb the optical photons emitted by the scintillator layer, wherein the CMOS light imager comprises a first surface and a second surface, wherein the first surface is disposed opposite the second surface, and the scintillator layer contacts the first surface of the CMOS light imager, and wherein the

CMOS light imager comprises field-effect transistors and an array of detector elements disposed on a semiconductor layer;

a reflective layer disposed on a surface of the scintillator layer opposite from the CMOS light imager, wherein a first surface of the reflective layer contacts the surface of the scintillator layer, and wherein the reflective layer is configured to reflect optical photons emitted by the scintillator towards the CMOS light imager;

a first detector cover comprising a first cover surface disposed on a second surface of the reflective layer opposite from the scintillator layer;

a first moisture blocking layer disposed between the first cover surface of the first detector cover and the second surface of the reflective layer, wherein a first surface of the first moisture blocking layer contacts the first cover surface and a second surface of the first moisture blocking layer contacts the second surface of the reflective layer, and wherein the first moisture blocking layer blocks moisture from contacting the scintillator layer;

a second moisture blocking layer, wherein a first surface of the second moisture blocking layer contacts the second surface of the CMOS light imager, and wherein the second moisture blocking layer blocks moisture from contacting the scintillator layer; and a pair of seals flanking the reflective layer, the scintillator layer, and the CMOS light imager, wherein the pairs of seals extend between the first and second moisture blocking layers, the pair of seals directly contact the reflective layer, the scintillator layer, and the CMOS light imager, and the pair of seals and the first and second moisture blocking layers together encapsulate the reflective layer, the scintillator layer, and the CMOS light imager.

2. The digital X-ray detector of claim 1, wherein the scintillator layer comprises cesium-iodide (CsI).

3. The digital X-ray detector of claim 1, comprising a second detector cover comprising a second cover surface disposed on the second surface of the CMOS light imager.

4. The digital X-ray detector of claim 3, wherein the second moisture blocking layer is disposed between the second cover surface of the second detector cover and the second surface of the CMOS light imager, wherein a second surface of the second moisture blocking layer contacts the second cover surface.

5. The digital X-ray detector of claim 4, wherein one or both of the first and second detector covers comprises a plurality of detector cover layers and filling material disposed between the plurality of detector cover layers.

6. The digital X-ray detector of claim 1, wherein the first surface of the CMOS light imager comprises a photodetector layer.

7. A method for assembling a digital X-ray detector comprising:

depositing a scintillator layer onto a photodetector layer of a complementary metal-oxide-semiconductor (CMOS) light imager, wherein the scintillator layer contacts the CMOS light imager;

disposing a reflective layer on a surface of the scintillator layer opposite from the CMOS light imager, wherein a first surface of the reflective layer contacts the surface of the scintillator layer, and wherein the reflective layer is configured to reflect optical photons emitted by the scintillator towards the CMOS light imager;

disposing a first detector cover having a first cover surface, wherein the first cover surface of the first detector cover is disposed on a second surface of the reflective layer opposite from the scintillator layer;

disposing a first moisture blocking layer between the first cover surface of the first detector cover and the second surface of the reflective layer opposite from the scintillator layer;

disposing a second moisture blocking layer on a surface of the CMOS light imager opposite from the photodetector layer, wherein a surface of the second moisture blocking layer contacts the surface of the CMOS light imager opposite from the photodetector layer; and disposing a pair of seals between the first and second moisture blocking layers that flank the reflective layer, the scintillator layer, and the CMOS light imager, wherein the pair of seals directly contact the reflective layer, the scintillator layer, and the CMOS light imager, and the pair of seals and the first and second moisture blocking layers together encapsulate the reflective layer, the scintillator layer, and the CMOS light imager.

8. The method of claim 7, comprising disposing a second detector cover having a second cover surface, wherein the second cover surface of the second detector cover is disposed on the surface of the CMOS light imager opposite from the photodetector layer.

9. The method of claim 8, wherein disposing the second moisture blocking layer on the surface of the CMOS light imager opposite from the photodetector layer comprises disposing the second moisture blocking layer between the second cover surface of the second detector cover and the surface of the CMOS light imager opposite from the photodetector layer.

10. A digital X-ray detector comprising:

a scintillator layer configured to absorb radiation emitted from a radiation source and to emit optical photons in response to the absorbed radiation;

a complementary metal-oxide-semiconductor (CMOS) light imager configured to absorb the optical photons emitted by the scintillator layer, wherein the CMOS light imager comprises a first surface and a second surface, wherein the first surface is disposed opposite the second surface, and the scintillator layer contacts the first surface of the CMOS light imager, and wherein the CMOS light imager comprises field-effect transistors and an array of detector elements disposed on a semiconductor layer;

a reflective layer disposed on a surface of the scintillator layer opposite from the CMOS light imager, wherein a first surface of the reflective layer contacts the surface of the scintillator layer, and wherein the reflective layer is configured to reflect optical photons emitted by the scintillator towards the CMOS light imager;

a first detector cover comprising a first cover surface disposed on a second surface of the reflective layer opposite from the scintillator layer;

a first moisture blocking layer disposed between the first cover surface of the first detector cover and the second surface of the reflective layer, wherein a first surface of the first moisture blocking layer contacts the first cover surface and a second surface of the first moisture blocking layer contacts the second surface of the reflective layer, and wherein the first moisture blocking layer blocks moisture from contacting the scintillator layer;

a second moisture blocking layer, wherein a first surface of the second moisture blocking layer contacts the second surface of the CMOS light imager, and wherein the second moisture blocking layer blocks moisture from contacting the scintillator layer; and a pair of seals flanking the reflective layer, the scintillator layer, and the CMOS light imager, wherein the pairs of seals extend between the first and second moisture blocking layers, the pair of seals directly contact the reflective layer, the scintillator layer, and the CMOS light imager, and the pair of seals and the first and second moisture blocking layers together encapsulate the reflective layer, the scintillator layer, and the CMOS light imager;

wherein the first and second moisture blocking layers comprise different materials than the first detector cover.

11. The digital X-ray detector of claim 10, wherein both the first and second moisture blocking layers comprise aluminum.

12. The digital X-ray detector of claim 1, wherein the pair of seals contact respective surfaces of the first and second moisture blocking layers.

* * * * *